United States Patent Office 3,484,487
Patented Dec. 16, 1969

3,484,487
AMINATION OF ARYL HALIDES
James S. Dix, Bartlesville, Okla., assignor to Phillips Petroleum Company, a corporation of Delaware
No Drawing. Filed Dec. 27, 1965, Ser. No. 516,758
Int. Cl. C07c 85/04
U.S. Cl. 260—577        11 Claims

ABSTRACT OF THE DISCLOSURE

An amination process for aryl halides comprising the reaction of an aminating agent with an aryl halide in the presence of a polar organic solvent such as N-methylpyrrolidone to yield aryl amines.

---

This invention relates to an improved process for making aryl amines. In one aspect this invention relates to the amination of aryl halides in the presence of a selected polar organic solvent to yield aryl amines.

Aryl amines have heretofore been prepared by a variety of means. For example, aniline is prepared by aminating chlorobenzene with ammonia in the presence of aqueous copper salts employed as catalysts. This direct technique utilizing relatively inexpensive starting materials works satisfactorily for making a simple compound such as aniline. However, such a technique is not effective in producing aryldiamine compounds. For example, amination of dichlorobenzene results in a poor reaction whether or not a copper catalyst is employed. Consequently these aryldiamines are best prepared from other more indirect routes frequently using more expensive reagents. For example, paraphenylenediamine was heretofore best prepared by the reduction of the nitro group on a paranitro-chlorobenzene.

It has now been surprisingly discovered that the direct amination of aryl halides, including the amination of aryl dihalides for the production of aryldiamines, can be effectively carried out when a selected polar organic compound is employed as the solvent.

Therefore it is an object of this invention to provide an improved process for making aryl amines.

Another object of this invention is to provide a process for improving the yield in aryl amine product when an aryl halide is directly aminated in the presence of a selected polar organic solvent as compared with similar prior art methods using water as a solvent.

Yet another object of this invention provides a process for preparing N,N,N',N'-tetramethyl-p-phenylenediamine by reacting p-dichlorobenzene with dimethylamine in the presence of N-methylpyrrolidone solvent.

Other objects and many of the attendant advantages of this invention will be readily appreciated as the same becomes better understood by reference to the following detailed description.

Briefly, it has been discovered that the amination of an aryl halide can be effectively improved by carrying out the amination in the presence of a selected polar organic solvent. The polar organic solvents which facilitate such amination reactions include amides, lactams, sulfones, and the like. N-methylpyrrolidone is preferred. However, other specific solvents which can be employed include hexamethylphosphoramide, tetramethylurea, N,N'-ethylenedipyrrolidone, pyrrolidone, caprolactam, N-ethylcaprolactam, sulfolane, dimethylacetamide, low molecular weight polyamides, and other such substances. The ratio of solvent to aryl halide is in the broad range of 0.5 to 50 parts solvent per part of aryl halide by weight.

The aminating agents useful in the practice of this invention include ammonia as well as the lower alkyl primary and secondary amines having up to about 5 carbon atoms per alkyl radical. Suitable examples of such aminating agents include methylamine, dimethylamine, diethylamine, isopropyl-n-butylamine, di-n-butylamine, n-amylamine and other such compounds. The amination with ammonia produces arylamines and amination with primary or secondary amines produces N-alkyl arylamines.

The aryl halides suitable for use in the practice of this invention include both the mono- and the polyhalobenzenes, naphthalenes, and anthracenes. The halo constituents include chloro, bromo, iodo and fluoro. At present the chloro and bromo substituents are preferred, and the aryl chlorides are particularly economical and easily available. Some examples of these halo compounds are chlorobenzene, paradichlorobenzene, bromobenzene, 1-fluoronaphthalene, 1,3,5-trichlorobenzene, hexabromobenzene, 2-iodoanthracene, 1-chloro-4-bromobenzene, and the like, and mixtures thereof. As stated hereinabove, the invention is particularly suitable for the preparation of aryldiamines by the amination of aryl dihalides.

In carrying out the process of this invention, the aryl halide and the aminating agent are contacted in any suitable contacting apparatus such that the reaction takes place in the liquid phase. The temperature of the reaction can range from room temperature or below up to about 350° C., preferably 100 to about 280° C., and at any convenient pressure which is sufficient to maintain a liquid phase. Pressures substantially higher than those required to maintain a liquid phase are sometimes beneficial. The reaction can be carried to any desired degree of completion and reaction times can vary from about 1 to about 25 hours.

The ratio of aminating agent to aryl halide will range from a theoretical to a ten-fold theoretical amount. If no acid acceptor is present, the theoretical amount is 2 mols of amine per atom of halogen present. If an acid acceptor is present, i.e., a solid inorganic base, the theoretical quantity is 1 mol of aminating agent per each atom of halogen present.

The process of the subject invention can be carried out either batchwise, intermittently, or continuously and, at the completion of the reaction, the products and reactants can be separated and isolated by conventional means. Each one or all of unreacted aminating agent, aryl halide, and diluent can be recycled if desired.

In order to further illustrate the advance in the art offered by the subject process, the following example is presented for illustrative purposes only.

EXAMPLE

Arylamines and aryldiamines were prepared in a number of runs using N-methylpyrrolidone (NMP) as a solvent. For purposes of comparison, two runs were carried out in an aqueous medium. A copper chloride catalyst was used in one of the aqueous runs as well as in one of the NMP runs.

The general procedure was to charge a 1400 ml. Autoclave Engineers stirred reactor with the aryl halide, solvent (the NMP was freshly distilled and anhydrous) and catalyst (if any). The reactor was sealed, cooled, and the amine added. The reactor was heated to the desired temperature which was maintained for the desired period with stirring. The mixture was then cooled, the gases vented, and the reaction mixture steam distilled. The distillate was extracted with benzene and the recovered aryl halide content determined by gas-liquid chromatography (GLC). When N,N-dimethylaniline was the product, it was also quantitatively determined by GLC. In the case of the diamines, the benzene extract was saturated with dry HCl and then extracted with water to remove the amines as the hydrochlorides. Treatment of the aqueous extracts with aqueous caustic followed by ether extraction and distillation yielded the desired products. The data are shown in the attached table.

AROMATIC AMINE FORMATION IN N-METHYLPYRROLIDONE (NMP)

| Run | Aryl chloride, g.-mols | Amine, g.-mols | Diluent, ml. | Temp., °C. | Time, hr. | Press., p.s.i.g. | Conv., percent | Yield, percent [3] | Ult. yield, percent [3] | Remarks |
|---|---|---|---|---|---|---|---|---|---|---|
| *Section 1: N,N-dimethylaniline from phenyl chloride and dimethylamine (DMA)* | | | | | | | | | | |
| 1 | Phenyl chloride, 1.0 | DMA, 2.2 | NMP, 400 | 280 | 2 | 600 | 36 | 7.7 | 21 | |
| 2 | do | DMA, 2.2 | H$_2$O, 500 | 250 | 4 | 950 | 3 | — | — | |
| 3 | do | DMA, 2.2 | NMP, 400 | 250 | 4 | 500 | 7.5 | 4.3 | 52 | 7 g. CuCl cat. used. |
| 4 | do | DMA, 2.2 | H$_2$O, 500 | 250 | 4 | 950 | 21 | *3.5 | 17.5 | 5 g. CuCl cat. used. |
| *Section 2: N,N,N',N'-tetramethyl-p-phenylenediamine from p-dichlorobenzene and dimethylamine* | | | | | | | | | | |
| 5 | p-DCB, 0.5 | DMA, 3.8 | NMP, 500 | 250 | 6 | 1,500 | 68 | 45.5 | 65 | Note 1. |
| *Section 3: N,N'-dimethyl-p-phenylenediamine from p-dichlorobenzene and methylamine* | | | | | | | | | | |
| 6 | p-DCB, 0.5 | MA, 5.0 | NMP, 475 | 250 | 7 | 840 | 63.5 | 23 | 33 | Note 2. |
| *Section 4: p-phenylenediamine from p-dichlorobenzene and ammonia* | | | | | | | | | | |
| 7 | p-DCB, 0.5 | NH$_3$, 4.1 | NMP, 500 | 260 | 5 | 1,250 | 7.2 | | | |

NOTES.—1. Yield on product distilled through short path apparatus at 15 mm. and 180° C. bath. Redistilled at 118–122° C./15 mm., yielding 38.4% yield of low melting solid, 2. B pt. 110–114° C./15 mm, n$_D^{20}$ 1.5815. Recovered 22.4 g. (30.5%) of p-DCB. 3. The presence of a (—) in the table indicates no determination of yield was made.
*By-products included about 3% N-methylaniline, 3% phenol, and a trace of diphenyl ether.

With respect to Runs 1 and 2 in the above table, there is shown the strikingly beneficial effects obtained when N-methylpyrrolidone is used as the solvent compared to water. Runs 3 and 4 show that this superiority persists even when a catalyst is used to improve the aqueous process. It is also noted that the aqueous process produces by-products which are not shown in the N-methylpyrrolidone process. Runs 5, 6 and 7 show the application of the invention to diamine products which are essentially unobtainable by the aqueous phase processes.

In summary, it is evident that the subject improved process teaches an economical and simple improvement which can be made in the direct amination of aryl halides in order to improve the overall conversion and yield and also to obtain products hitherto essentially unobtainable in such processes.

Obviously many modifications and variations of the present invention are possible in the light of the above teachings. It is therefore to be understood that the invention may be practiced otherwise than as specifically described herein.

What is claimed is:
1. A process for preparing aryl amines, said process comprising the steps of reacting an aminating agent selected from the group consisting of ammonia or the lower alkyl primary and secondary amines having from 1 to 5 carbon atoms per alkyl radical, with an aryl halide selected from the mono and polyhalobenzenes, halonaphthalenes, and haloanthracenes in the presence of a polar organisc solvent selected from the group consisting of N-methylpyrrolidone, hexamethylphosphoramide, tetramethylurea, N,N'-ethylenedipyrrolidone, pyrrolidone, caprolactam, N-ethylcaprolactam, sulfolane, and dimethylacetamide.

2. A process according to claim 1 further characterized in that the amination is conducted at a temperature and pressure sufficient to maintain the reactants in liquid phase and the polar solvent is present in an amount ranging from 0.5 to 50 parts solvent per part of aryl halide by weight.

3. The process according to claim 2 wherein N,N,N',N'-tetramethyl-p-phenylenediamine is prepared by reacting p-dichlorobenzene with dimethylamine in the presence of N-methylpyrrolidone.

4. A process according to claim 2 wherein said aryl halide is phenyl chloride and said aminating agent is dimethylamine.

5. A process according to claim 2 wherein said aryl halide is p-dichlorobenzene and said aminating agent is methylamine.

6. A process according to claim 2 wherein said aryl halide is p-dichlorobenzene and said aminating agent is ammonia.

7. A process according to claim 2 wherein said polar organic solvent is N-methylpyrrolidone.

8. A process according to claim 2 wherein said aryl halide is p-dichlorobenzene and said aminating agent is methylamine and said aminating process is carried out in the presence of a copper chloride catalyst.

9. A process according to claim 2 wherein said polar organic solvent is hexamethylphosphoramide.

10. A process according to claim 2 wherein said polar organic solvent is tetramethylurea.

11. A process according to claim 2 wherein said polar organic solvent is sulfolane.

References Cited

UNITED STATES PATENTS 2,212,825  8/1940  Daudt et al.
3,057,922  10/1962  Luvisi.
2,809,994  10/1957  Hinckley _____ 260—574

CHARLES B. PARKER, Primary Examiner
R. L. RAYMOND, Assistant Examiner

U.S. Cl. X.R.
260—576, 581